(12) United States Patent
Bar et al.

(10) Patent No.: US 7,011,121 B2
(45) Date of Patent: Mar. 14, 2006

(54) END PIECE FOR A FUEL FILLER PIPE OF A VEHICLE

(75) Inventors: Jean-Philippe Bar, Auneuil (FR); Dany Delafraye, Allonne (FR)

(73) Assignee: I.T.W. De France, Beauchamp (FR)

( * ) Notice: Subject to any disclaimer, the term of this patent is extended or adjusted under 35 U.S.C. 154(b) by 0 days.

(21) Appl. No.: 11/098,374

(22) Filed: Apr. 5, 2005

(65) Prior Publication Data

US 2005/0224139 A1 Oct. 13, 2005

(30) Foreign Application Priority Data

Apr. 8, 2004 (FR) .................................. 04 03708

(51) Int. Cl.
*B65B 1/04* (2006.01)
(52) U.S. Cl. ..................... 141/350; 220/86.2
(58) Field of Classification Search ............... 141/301, 141/349, 350; 220/86.2
See application file for complete search history.

(56) References Cited

U.S. PATENT DOCUMENTS 3,730,216 A * 5/1973 Arnett et al. ............... 137/588

2002/0020465 A1 2/2002 Gzik

FOREIGN PATENT DOCUMENTS

| DE | 40 39 269 | 2/1992 |
|----|-----------|--------|
| EP | 1 262 355 | 12/2002 |
| EP | 1 262 356 | 12/2002 |
| EP | 1 284 212 | 2/2003 |
| EP | 1 319 545 | 6/2003 |
| FR | 2 244 344 | 4/1975 |

* cited by examiner

*Primary Examiner*—Steven O. Douglas
(74) *Attorney, Agent, or Firm*—Lowe Hauptman & Berner, LLP

(57) ABSTRACT

It comprises a protection assembly comprising two latches mounted on a shutter and two mortises, each latch having a catch and, when the shutter is in an obturating position, being able to assume an operating position in which its catch is engaged in a respective one of said mortises such that said latch fixes the shutter, each latch having a maneuvering portion adapted to cooperate with the edge of said spout of appropriate diameter for said latch to be driven to a withdrawn position by said spout when it meets a maneuvering portion during a thrusting movement into the end piece, the maneuvering portion of each latch being separated from the maneuvering portion of the other latch by a free space having a length smaller than said appropriate diameter and greater than an inappropriate spout diameter.

18 Claims, 4 Drawing Sheets

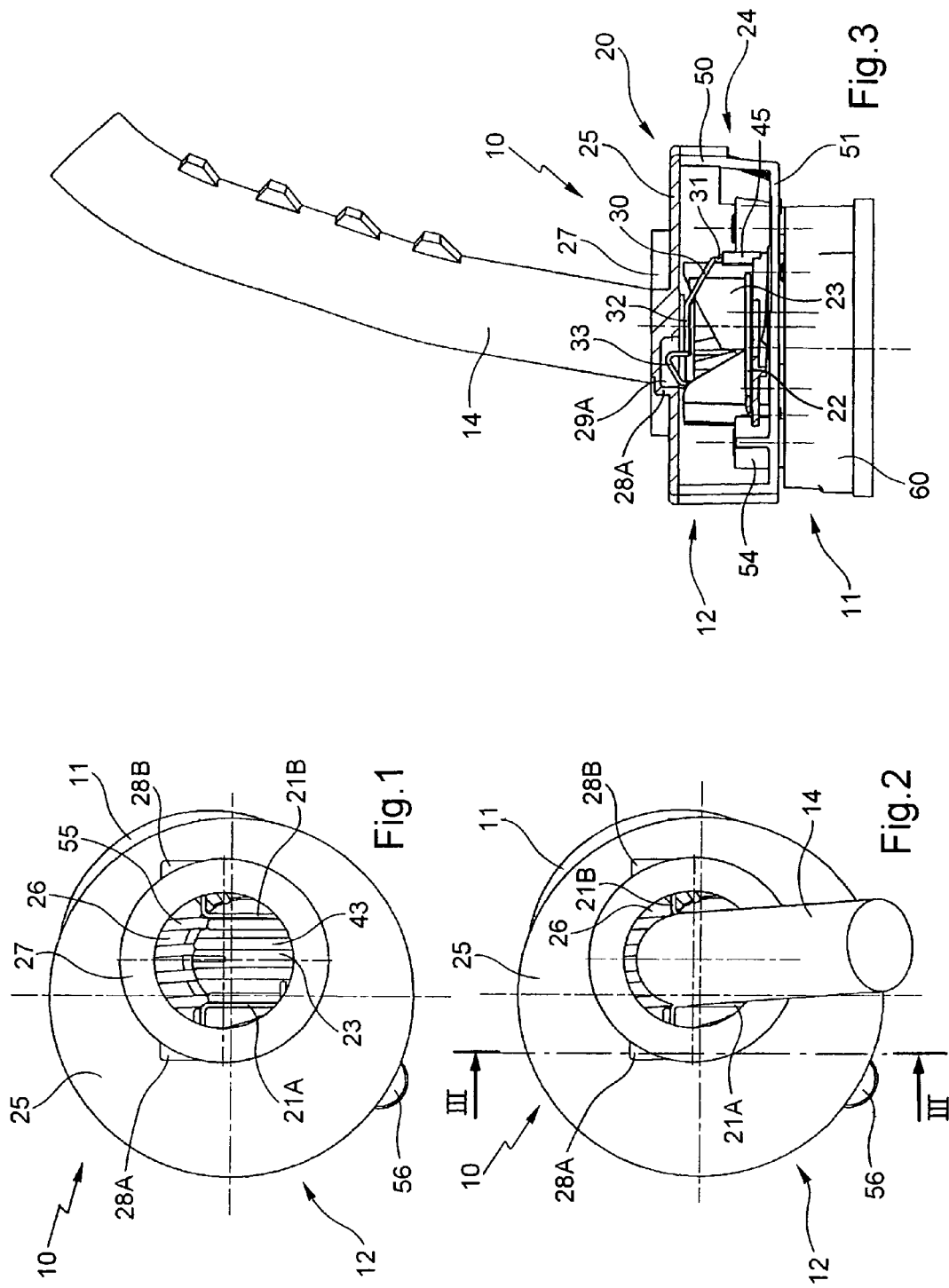

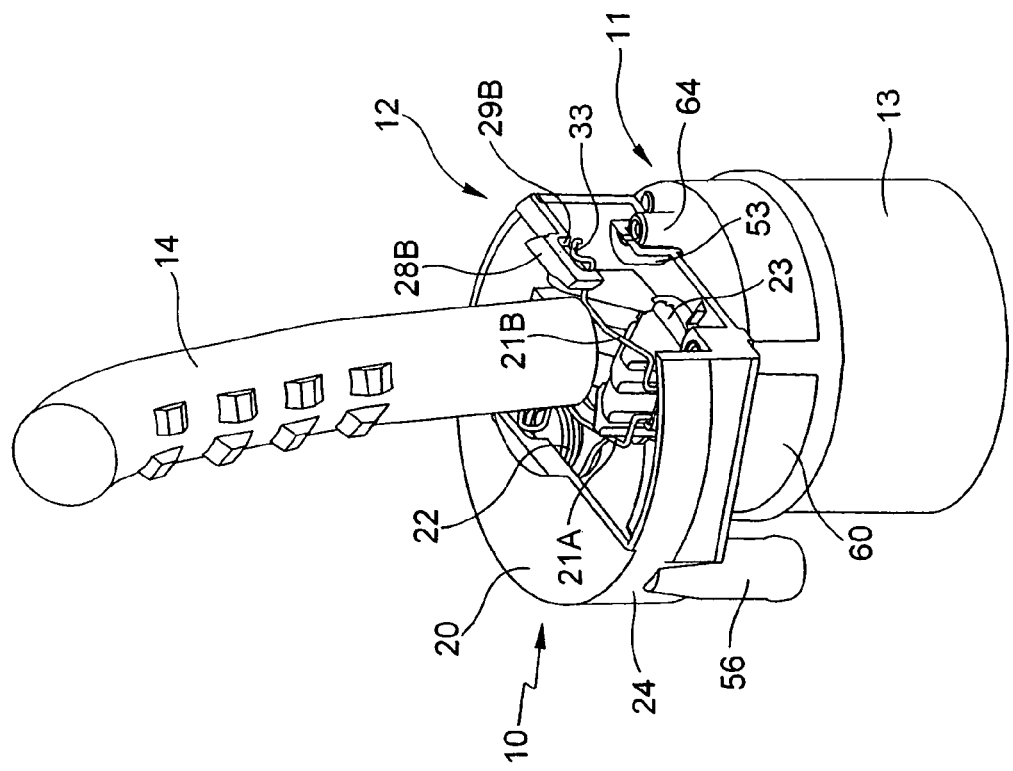
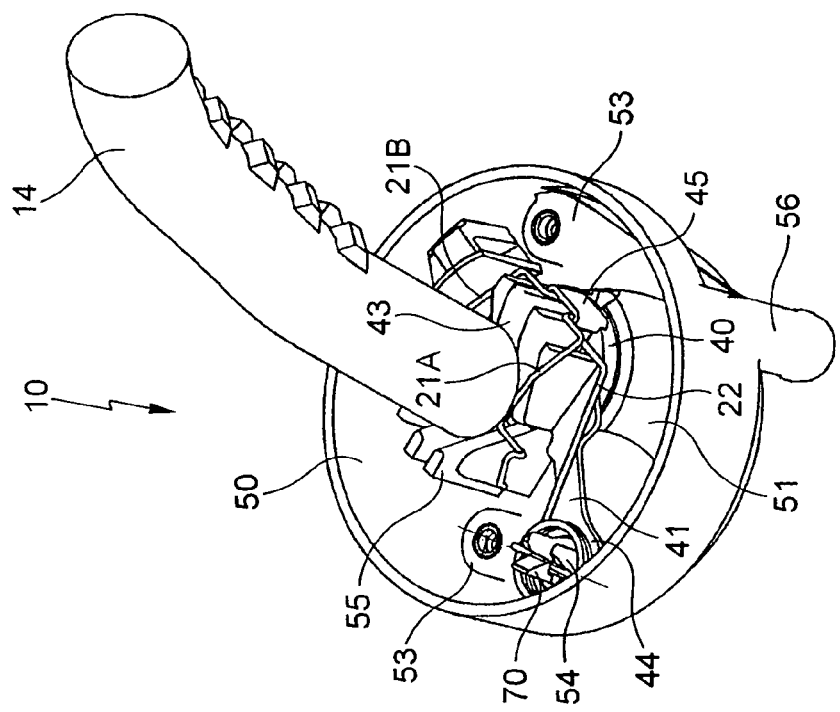

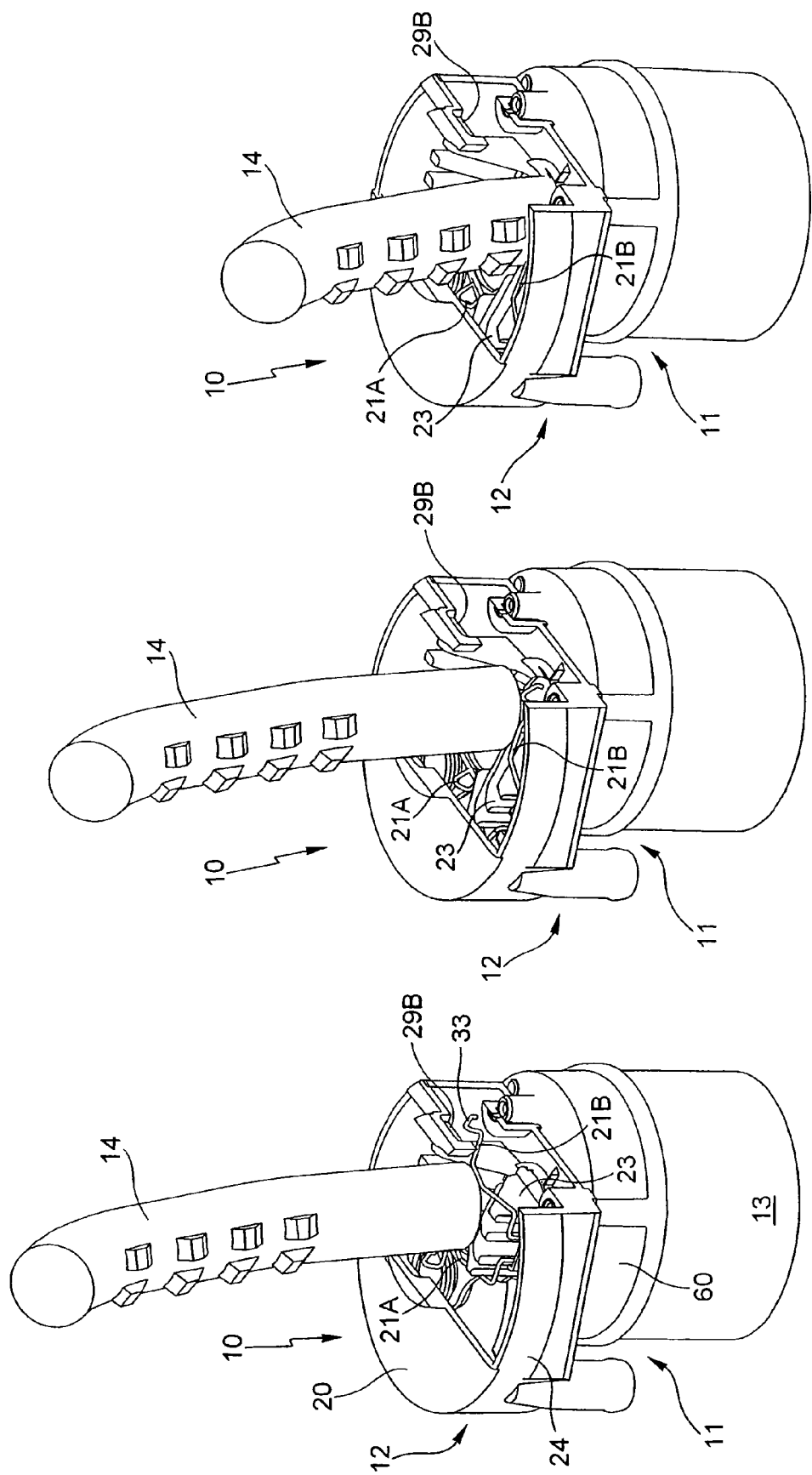

END PIECE FOR A FUEL FILLER PIPE OF A VEHICLE

RELATED APPLICATIONS

The present application is based on, and claims priority from, French Application Number 04 03708, filed Apr. 8, 2004, the disclosure of which is hereby incorporated by reference herein in its entirety.

FIELD OF THE INVENTION

The invention relates to the filling of vehicles with fuel, and more particularly to the end pieces with which vehicles are provided to cooperate with the spout at the end of a fuel supply nozzle.

BACKGROUND OF THE INVENTION

It is know that the outer diameter of the spout of such a nozzle in practice has a value which depends on the fuel distributed. Thus, the spout of a nozzle belonging to a pump supplying diesel or leaded petrol has a greater diameter than the spout of a nozzle belonging to a pump supplying lead-free petrol.

Various measures are known, in particular from the French patent 2 244 344, which are taken such that the end piece of the filler pipe of a vehicle using lead-free petrol cannot accept the spout of a supply nozzle of a diesel or leaded petrol pump; such a spout, due to its diameter being greater that that of a spout for lead-free petrol, cannot enter into an aperture dimensioned for that purpose.

Various measures, in particular from the European patents 1 262 355, 1 262 356, 1 284 212 and 1 319 545, are known for solving the converse problem, i.e. preventing a nozzle spout from a lead-free petrol pump entering a filler end piece for a diesel vehicle.

SUMMARY OF THE INVENTION

The invention is directed to providing such an end piece which is particularly simple, convenient and economic, with respect to both manufacture and use.

To that end it provides an end piece for a fuel filler pipe of a vehicle provided for allowing the passage to said pipe of a supply spout exclusively if the outer diameter of said spout is at least equal to a predetermined threshold, the end piece being characterized in that it comprises a protection assembly comprising:

a body having an aperture for spout passage to said pipe;

a shutter movable with respect to said body, able to assume an obturating position in which it conceals said passage aperture and a freeing position in which it does not conceal said passage aperture, said shutter being elastically urged towards said obturating position, said body and said shutter being adapted to cooperate with said spout in order for the shutter to be driven towards the freeing position by said spout when it meets the shutter, during a thrusting movement into the end piece; and two latches mounted on the shutter and two mortises belonging to the body, each latch having a catch and, when the shutter is in said obturating position, being able to assume an operating position in which its catch is engaged in a respective one of said mortises such that said latch fixes the shutter with respect to said body, and being able to assume a withdrawn position in which its catch is clear of said mortise, each latch being elastically urged towards said operating position, each latch having a maneuvering portion adapted to cooperate with the edge of said spout in order for said latch to be driven to the withdrawn position by said spout when it meets the maneuvering portion during a thrusting movement into the end piece, the maneuvering portion of each latch being separated from the maneuvering portion of the other latch by a free space having a length equal to said predetermined threshold.

A spout of greater diameter than the predetermined threshold, for example a spout for diesel, is thus capable, when it is thrust into the protection assembly, of driving each of the two latches to the withdrawn position, such that the shutter can then be driven to the freeing position.

On the other hand, given the length of the free space between the maneuvering portions of the latches, a spout of smaller diameter than the predetermined threshold, for example a spout for lead-free petrol, will only be able to act on one of them at a time, such that there will always remain one of the latches to lock the shutter in the obturating position, so preventing access to the filler pipe.

According to features that are preferred as being simple, convenient and economic to implement:

said shutter is movable parallel to a wall in which said passage aperture is provided, said shutter being situated in front of said wall, the maneuvering portion of each said latch being situated in front of said shutter in said operating position, and possibly said body has a wall situated in front of said shutter, said mortises being provided in said wall situated in front; and/or each said latch is of elastic metal wire; and possibly each said latch comprises an elbow portion forming said maneuvering portion; and possibly said elbow portion is connected by a first end to said catch; and possibly said catch is in the general form of an inverted U; and/or said elbow portion is connected by a second end to a straight portion; and possibly said straight portion is connected by a first end to said elbow portion, referred to as the first elbow portion, and by a second end to a second elbow portion; and possibly in operating position, said first elbow portion is oriented in a generally vertical plane whereas said second elbow portion is oriented in a generally horizontal plane; and/or the two latches are joined by an intermediate portion, with the end of each said second elbow portion that is remote from said straight portion being connected to said intermediate portion.

According to other preferred features, for the same reasons:

the two latches have a similar arrangement, the shape of one being the mirror image of the shape of the other; and/or said body comprises a back wall in which said passage aperture is provided and a front wall in which an aperture for entry into the protection assembly is provided, said shutter and said latches being arranged between said back wall and said front wall; and possibly said back wall is part of a cup whereas said front wall is part of a cover added on said cup; and/or said body comprises, bordering said passage aperture, a set of ribs arranged side by side and each having an inclined side of which the base is located at the edge of the passage aperture, said sides being inclined forwardly and outwardly, whereas said shutter has a set of ribs each having an inclined side, the inclined sides of the ribs of the body and of the ribs of the shutter facing each other in said obturating position; and/or said body is provided with a duct for evacuation of liquid that may have entered therein; and/or the end piece comprises, behind said protection assembly, an obturating assembly; and possibly said obturating assembly has a flap valve.

BRIEF DESCRIPTION OF THE DRAWING

The explanation of the invention will now be continued with the detailed description of a preferred embodiment, given below by way of non-limiting example, with reference to the accompanying drawings. In the drawings:

FIG. 1 is a side elevation of an end piece according to the invention, viewed from the front, that is to say from the side from which the spout of the end of the appropriate supply nozzle is intended to be inserted;

FIG. 2 is a similar view, but with such a supply spout engaged in the entry aperture, the edge of the spout being in contact with the maneuvering portion of each of the two latches which the protection assembly of the end piece comprises;

FIG. 3 is a section view in elevation on III—III of FIG. 2;

FIG. 4 is a perspective view of the end piece and of the spout, in the same position as in FIGS. 2 and 3, the cover of the protection assembly having been removed;

FIG. 5 is another perspective view of the end piece and of the spout in the same position, with the protection assembly of the end piece shown partially cut away, a portion of a fuel filler pipe, on which the end piece is mounted, also being illustrated;

FIGS. 8 to 10 are similar views to FIG. 5, showing successive steps of the movement of thrusting the spout into the end piece in order for the distal end of the spout to access the filler pipe.

DETAILED DESCRIPTION OF THE INVENTION

Figure 6:
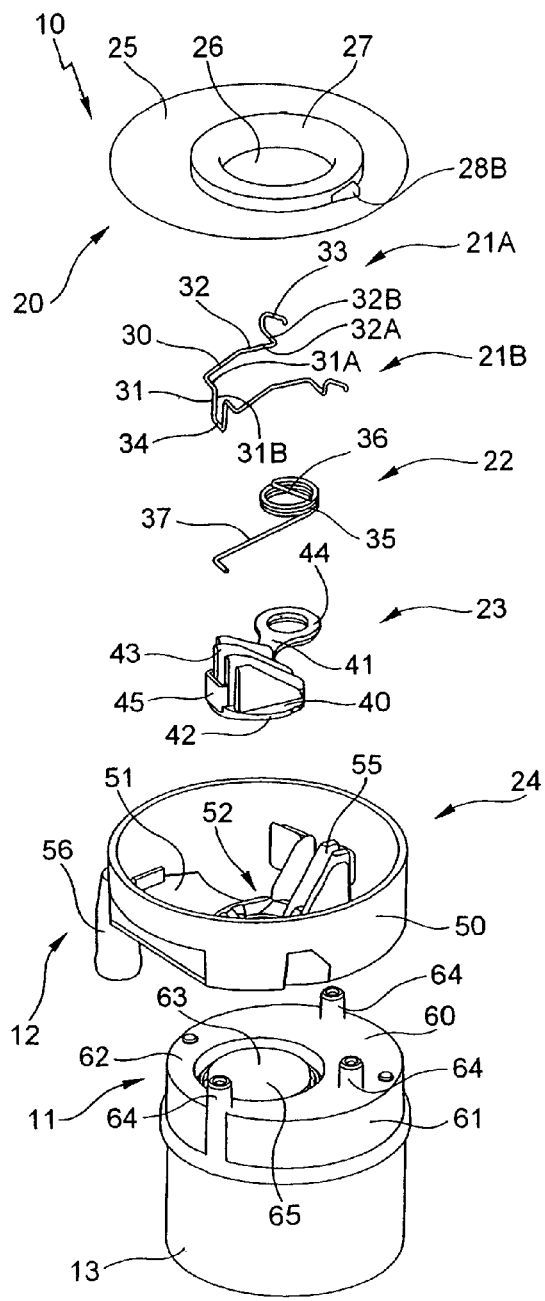
FIG. 6 is an exploded perspective view of the end piece and of the portion of the filler pipe, from substantially the same angle as the view illustrated in FIG. 5.

The end piece 10 illustrated in the drawings comprises an obturating assembly 11 and a protection assembly 12.

The assembly 11 is adapted for mounting on an end of a pipe 13 (FIGS. 5 to 10) for filling a vehicle fuel tank (not shown) with fuel, here diesel, the tank being disposed at the other end of the pipe 13 (only a portion of the pipe 13 situated in the neighborhood of the assembly 11 is shown).

The assembly 11 is adapted for being fixed from behind (the side which is seen downwards in FIGS. 3 to 10) to pipe 13. Assembly 12 is fixed to the front (the side which is seen upwards)

Assembly 11 and assembly 12 are adapted to securely obdurate the pipe 13 in an operating configuration and, from the operating configuration, by a simple thrusting movement, to allow the passage of the spout 14 of a supply nozzle for an appropriate fuel, the fuel being diesel here, through assembly 12 and then assembly 11, in order to reach the filling position illustrated in FIG. 10, in which the distal end of the spout 14 communicates with the interior space of the pipe 13.

The protection assembly 12 will now be described in detail.

Figure 7:
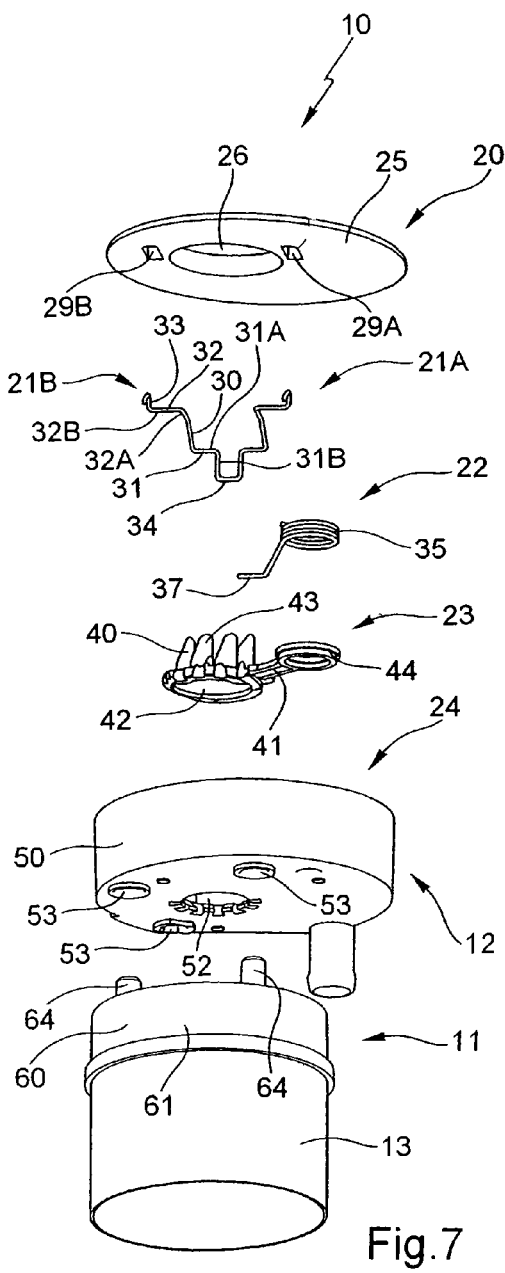
FIG. 7 is a similar view, but from a different angle.

As can be seen in particular in FIGS. 6 and 7, this assembly comprises a cover 20, latches 21A and 21B, a spring 22, a shutter 23 and a cup 24.

With the exception of the latches 21A and 21B and the spring 22, these different members are of molded plastics material.

The cover 20 comprises a plane wall 25 of circular outline in which there is provided, in an eccentric position, an aperture 26 for introduction of the spout 14. On the front side (the side which can be seen upwards in FIGS. 3 to 10), the aperture 26 is bordered by an annular bead 27 which projects with respect to the rest of the wall 25. Two lugs 28A and 28B, which are visible in particular in FIGS. 1 and 2, project from the outer side wall of the bead 27.

Two mortises 29A and 29B (FIG. 7) are respectively provided at lug 28A and at lug 28B, the mortises 29A and 29B opening from the rear side of the cover 20 (the side which is seen downwards in FIGS. 3 to 10)

Each of the latches 21A and 21B is of elastic metal wire (spring wire) formed by bending They each comprise a straight portion 30 which is connected by each end to an elbow portion, respectively 31 and 32. The planes in which the portions 31 and 32 are situated are disposed transversely with respect to each other.

The elbow portion 31, which is connected by one branch 31A to the end of portion 30 which is seen downwards in FIGS. 3 to 10, is oriented in a generally horizontal plane in the operating position, whereas the elbow portion 32, which is connected by one branch 32A to the other end of the straight portion 30, is oriented in a generally vertical plane in the operating position. Portion 31 is situated behind portion 30 and portion 32 is situated in front of portion 30, the latter being inclined forwardly and upwardly.

Branch 31A of the elbow portion 31 which is connected to the straight portion 30 is generally horizontally oriented. The same applies for branch 32B of the elbow portion 32 i.e. the branch other than the branch 32A which is connected to the portion 30.

Branch 31A extends from the intermediate portion 30 inwardly of the protection assembly 12 whereas branch 32B extends from branch 32A outwardly of the assembly 12.

At the end remote from portion 30, portion 32 is connected to a catch 33 in the general form of an inverted U.

The catch 33 is disposed in a plane that is generally vertical in the operating position, transverse to the plane in which lies the elbow portion 32, the catch 33 projecting forwards with respect to that portion.

The two latches 21A and 21B have a similar arrangement, the shape of one being the mirror image of the shape of the other.

The two latches 21A and 21B are here made from the same length of metal wire. They are joined by an intermediate straight portion 34, of which the general orientation is the same as for the branches 31A and 32B, with the end of each branch 31B remote from branch 31A being connected to portion 34.

Spring 22 is of elastic metal wire (spring wire). It comprises a helical portion 35 connected by one end to a straight portion 36 disposed along a diameter and, by the other end, to an elbow portion 37 of which the branch connected to portion 35 is much longer than the other branch.

Shutter 23 comprises a closure 40 and an arm 41.

The closure 40 has a generally flat base 42, of circular outline, and ribs 43 which project forwardly from the base 42.

The ribs 43 are parallel to each other and each have an outline in the general form of a right-angled triangle, i.e. with a first side which is connected by a right angle to a second side while a third side meets the end of the first side and the end of the second side that are remote from those by which the first side and the second are connected, the first side corresponding here to the base 42.

Arm 41 has one end by which it is connected to the closure 40 whereas it has an eye 44 at the other end for pivotal mounting of the shutter 23 about a shaft corresponding to that of the central hole of the eye 44.

The angle between the straight line along which arm 41 is oriented and the planes in which the ribs 43 lie is of the order of 50°.

In addition to base 42 and ribs 43, closure 40 comprises a bridging member 45 disposed between two ribs 43, on the side which is transversely oriented to base 42, approximately over half the height of those ribs, the bridging member 45 and the ribs to which it is connected delimiting a cavity for the mounting of the latches 21A and 21B on the shutter 23.

The cup 24 comprises a generally cylindrical side wall 50 and a generally plane bottom wall 51, in which an aperture 52 (FIG. 7) is provided for passage of the spout 14 to pipe 13.

As can be seen especially in FIG. 4, hollow chimneys 53, there being three of them here, project from the bottom wall 51 from the front side, in order to enable the assembly of the protection assembly 12 and the obturating assembly 11, as will be seen below.

A finger 54 (not shown in FIG. 6) also projects from the bottom wall 51, from the front side, and serves, as will be seen below, for the mounting of the shutter 23 with respect to the cup 24 and also for the mounting of the spring 22.

A set of ribs 55 disposed side by side and at the edge of aperture 52 also project from the bottom wall 51, from the font side.

The ribs 55 each have an inclined side of which the base is located at the edge of the passage aperture 52, the ribs concerned being inclined forwardly and outwardly of the protection assembly 12.

The cup 24 also comprises a duct 56 one end of which opens into the lower part of bottom wall 51.

The duct 56 serves for evacuation of liquid from cup 24 that may have entered therein, for example run-off water or water from washing.

The obturating assembly 11 comprises a dome 60 presenting a generally cylindrical lateral wall 61 and a transverse end wall 62 of generally circular outline, presenting an aperture 63 off center for passage of the spout 14.

Nipples 64 having a central hole project forwardly from wall 62, and are each adapted to be received in a chimney 53 of cup 24.

The assembly 11 also comprises, behind wall 62, a flap valve 65 mounted on the dome 60 and biased by a spring towards the position illustrated in FIG. 6, in which it obturates the aperture 63 in a fluid-tight manner by virtue of a peripheral seal, the flap valve 65 being able to flap rearward in order to permit the engagement of the spout 14 in the aperture 63.

The assembly of assembly 11 and cup 24 is performed by situating wall 51 and 62 opposite each other with the apertures 52 and 63 which are aligned, and with the nipples 64 which are introduced into the chimneys 53.

Assembly of cup 24 and assembly 11 is finished using screws (not shown). The shaft of each screw is introduced through the hole provided at the front of one of the chimneys 53 then into the central hole of the corresponding nipple 64, and then tightening of each screw is carried out, during which the thread of each shaft engages the material of the corresponding nipple 64, until the head of the screw abuts the front of the chimney 53.

The shutter 23 is put in place in the cup 24 with its face remote from ribs 43 facing the bottom wall 51 and with the finger 54 engaged in the central hole of the eye 44.

Spring 22 is disposed in front of arm 41 with portion 35 around finger 54 and the diametral portion 36 held on finger 54 by a notch 70 (FIG. 4), the end of arm 37 of spring 22 that is remote from portion 35 bearing on the closure 40.

Due to the engagement of finger 54 in the hole of eye 44 and by virtue of the fact that eye 44 is held on finger 54 by means of portion 35 of spring 22 by virtue of notch 70, the shutter 23 is pivotally mounted about the shaft of finger 54. Shutter 23 is thus moveable parallel to wall 51.

Spring 22 biases shutter 23 in the direction in which closure 40 tends to approach the ribs 55, i.e. towards the obturating position illustrated in FIGS. 1 to 5 and 8, in which the closure 40 conceals the passage aperture 52, the shutter 23 being able to pivot about finger 54 against spring 22, i.e. in the direction in which closure 40 moves away from the ribs 55, until aperture 52 is revealed (position illustrated in FIG. 10).

In the obturating position, the inclined sides of the ribs 55 and 43 are opposite each other, the surface of envelope passing along the inclined sides of the ribs 55 and along the inclined sides of the ribs 43 being of V-shaped general section.

The assembly formed by latch 21A, by latch 21B and by the portion of metal wire 34 that joins them is mounted on shutter 23 by force fitting of the U-shaped portion constituted by portion 34 and, on each side thereof, by a branch 31B, into the cavity delimited by the bridging member 45 and two of the ribs 43.

As can be seen in FIGS. 1 to 5, without being urged, each of the latches 21A and 21B assumes an operating position in which the two portions 32 are situated in front of closure 40, with each portion 32 separated from the other portion 32 by a free space the length of which corresponds to the separation between the outer side walls of the two outermost ribs 43.

The cover 20 is put into place in front of the cup 24, with the rear face of the wall 25 bearing on the edge of wall 50, aperture 26 being aligned with apertures 52 and 63.

Cover 20 and cup 24 are fixed to each other by means not shown, here by ultrasonic welding.

When the shutter 23 is in the obturating position (position illustrated in FIGS. 1 to 5), the catch 33 of each of the latches 21A and 21B is respectively accommodated in the mortise 29A and in the mortise 29B.

The spout 14 for supplying the pipe 13 with diesel has a conventional outer diameter, i.e. of the order of 24 mm.

The apertures 26, 52 and 63, which must allow passage of spout 14, naturally have a larger diameter.

The spacing between the portions 32 of the latches 21A and 21B is slightly smaller than the outer diameter of the spout 14, such that when its end is introduced through the aperture 26, its edge bears on portion 32 of each of the latches 21A and 21B, as shown in FIGS. 2 to 5.

If the movement of thrusting the spout 14 into the protection assembly 12 continues, the spout pushes each of the latches 21A and 21B rearwards such that the catch 33 of each of these latches is freed from the corresponding mortise at the moment that the edge of the spout 14 encounters the inclined sides of the ribs 55 and 43 (see FIG. 8).

Due to the orientation of the inclined sides of the ribs 43 and 55 and the disposition of the finger 44 with respect to those ribs when the shutter 23 is in the obturating position, the effect of continuing the movement of thrusting the spout 14 into the protection assembly 12 is to drive the shutter 23 to pivot in order to move aside the ribs 55, this pivotal movement being possible due to the fact that the catches 33 have been freed from the mortises 29A and 29B (see FIG. 9).

The pivotal movement of the shutter 23 continues until the passage aperture 52 is no longer concealed by the shutter 23, the spout 14 then passes through the aperture 52, it engages in the aperture 63 and its edge abuts with the flap valve 65, which then flaps rearwardly to allow the spout 14 to enter through the aperture 63, such that the spout 14 accesses the interior space of the filler pipe 13 (see FIG. 10).

In case, instead of a spout 14 of a diesel supply nozzle, it had been attempted to introduce into the protection assembly 12 a spout of a lead-free petrol supply nozzle, of which the outer diameter is smaller than that of the spout 14, and in this case of the order of 21 mm, the end of the spout of that nozzle could pass through aperture 26 of cover 20 and encounter one of the two latches 21A and 21B, but could not act on both latches at a time since the length of the free space separating them, i.e. 23 mm, is greater than the outer diameter of the lead-free petrol supply spout.

Consequently, the catch 33 of one or other of the latches 21A and 21B will remain engaged in the corresponding mortise and will keep the shutter 23 from moving into the obturating position of the aperture 52, so preventing access of the lead-free petrol supply spout to the flap valve 65, and thereby to the filler pipe 13.

It will be noted that if a jet of fluid under pressure, for example coming from the wand of a high pressure cleaning machine, is introduced into the protection assembly 12 through aperture 26, it will be able to flow through the free spaces left between the ribs 43 and between the ribs 55, with the shutter 23 remaining in the obturating position, the liquid that was able to enter the enclosure formed by the cup 24 and the cover 20 being evacuated from that enclosure by the duct 56.

Thus, a possible jet of liquid under pressure to which the end piece 10 is subjected cannot cause the flap valve 65 to open, and thus cannot enter the filler pipe 13.

In a variant form not shown, the latches 21A and 21B of metal wire are of different form, in particular as regards their mounting on the shutter 23, each latch being for example mounted on the shutter 23 at a separate location; and/or the mortises cooperating with the catches of the latches which are situated at another location of the body constituted by the cup 24 and the cover 20, the mortises for example being provided in the bottom wall 51 of the cup 24.

In another variant not shown, the metal wire latches are replaced by rigid latches, for example of molded plastics material, biased towards the operating position by an elastic member such as a spring, such latches having for example an elbow form with a branch having a maneuvering portion adapted to cooperate with the edge of the spout having the appropriate diameter and another branch of which the end, in the operating position, is engaged in the mortises of the bottom of the cup 24.

In still another variant, the obturating assembly 11, situated behind the protection assembly 12, is replaced by a conventional cap situated in front of the protection assembly.

Numerous other variants are possible according to circumstances, and in this connection it is to be noted that that the invention is not limited to the examples described and shown.

What is claimed is:

1. An end piece for a fuel filler pipe of a vehicle provided for allowing the passage to said pipe of a supply spout exclusively if the outer diameter of said spout is at least equal to a predetermined threshold, the end piece comprises a protection assembly comprising:

a body having an aperture for spout passage to said pipe;

a shutter movable with respect to said body, able to assume an obturating position in which it conceals said passage aperture and a freeing position in which it does not conceal said passage aperture, said shutter being elastically urged towards said obturating position, said body and said shutter being adapted to cooperate with said spout in order for the shutter to be driven towards the freeing position by said spout, during a thrusting movement of the latter into the end piece, when it meets the shutter; and two latches mounted on the shutter and two mortises belonging to the body, each latch having a catch and, when the shutter is in said obturating position, being able to assume an operating position in which its catch is engaged in a respective one of said mortises such that said latch fixes the shutter with respect to said body, and being able to assume a withdrawn position in which its catch is clear of said mortise, each latch being elastically urged towards said operating position, each latch having a maneuvering portion adapted to cooperate with the edge of said spout in order for said latch to be driven to the withdrawn position by said spout when it meets the maneuvering portion during a thrusting movement into the end piece (10), the maneuvering portion of each latch being separated from the maneuvering portion of the other latch by a free space having a length equal to said predetermined threshold.

2. An end piece according to claim 1, wherein said shutter is movable parallel to a wall in which said passage aperture is provided, said shutter being situated in front of said wall, the maneuvering portion of each said latch being situated in front of said shutter in said operating position.

3. An end piece according to claim 2, wherein said body has a wall situated in front of said shutter, said mortises being provided in said wall situated in front.

4. An end piece according to claim 1, wherein each said latch is of elastic metal wire.

5. An end piece according to claim 4, wherein each said latch comprises an elbow portion forming said maneuvering portion.

6. An end piece according to claim 5, wherein said elbow portion is connected by a first end to said catch.

7. An end piece according to claim 6, wherein said catch is in the general form of an inverted U.

8. An end piece according to claim 6, wherein said elbow portion is connected by a second end to a straight portion.

9. An end piece according to claim 8, wherein said straight portion is connected by a first end to said elbow portion, referred to as the first elbow portion, and by a second end to a second elbow portion.

10. An end piece according to claim 9, wherein, in operating position, said first elbow portion is oriented in a generally vertical plane whereas said second elbow portion is oriented in a generally horizontal plane.

11. An end piece according to claim 9, wherein the two latches are joined by an intermediate portion, with the end of each said second elbow portion that is remote from said straight portion being connected to said intermediate portion.

12. An end piece according to claim 1, wherein the two latches have a similar arrangement, the shape of one being the mirror image of the shape of the other.

13. An end piece according to claim 1, wherein said body comprises a back wall in which said passage aperture is provided and a front wall in which an aperture for entry into the protection assembly is provided, said shutter and said latches being arranged between said back wall and said front wall.

14. An end piece according to claim 13, wherein said back wall is part of a cup whereas said front wall is part of a cover added on said cup.

15. An end piece according to claim 1, wherein said body comprises, bordering said passage aperture, a set of ribs arranged side by side and each having an inclined side of which the base is located at the edge of the passage aperture, said sides being inclined forwardly and outwardly, whereas said shutter has a set of ribs each having an inclined side, the inclined sides of the ribs of the body and of the ribs of the shutter facing each other in said obturating position.

16. An end piece according to claim 1, wherein said body is provided with a duct for evacuation of liquid that may have entered therein.

17. An end piece according to claim 1, wherein it comprises, behind said protection assembly, an obturating assembly.

18. An end piece according to claim 17, wherein said obturating assembly has a flap valve.

* * * * *